United States Patent [19]
McIntire

[11] 3,796,191
[45] Mar. 12, 1974

[54] LOADING CHUTE WITH RETRACTABLE LANDING GEAR

[76] Inventor: Daryl C. McIntire, Seymour, Iowa 52590

[22] Filed: Oct. 12, 1972

[21] Appl. No.: 296,974

[52] U.S. Cl. ..................................... 119/82, 280/30
[51] Int. Cl. ........................................... A01k 29/00
[58] Field of Search ................ 119/82, 159; 280/30

[56] References Cited
UNITED STATES PATENTS
| | | | |
|---|---|---|---|
| 2,941,813 | 6/1960 | Price | 119/82 X |
| 2,466,102 | 4/1949 | Heldenbrand | 280/30 |
| 2,524,641 | 10/1950 | Suttles, Jr. | 119/159 |

*Primary Examiner*—Louis G. Mancene
*Assistant Examiner*—J. A. Oliff
*Attorney, Agent, or Firm*—Zarley, McKee & Thomte

[57] ABSTRACT

An animal loading chute with retractable landing gear and capable of serving as a loading chute, a holding chute and a trailer device. A first shaft is secured to and extends beneath the floor of the chute and has triangular supports pivotally secured, at one point thereof, to the opposite ends thereof. Each of the triangular supports has an axle spindle extending from its second point which has a wheel mounted thereon. A winch means is connected to the third points of the triangular supports for selectively pivoting the supports with respect to the chute so that the wheels will be raised and lowered with respect to the chute. A removable safety bar selectively interconnects the triangular supports when the chute is being used as a trailer device. A spray attachment is also provided on the chute for spraying disinfectant or the like on the animal in the chute.

10 Claims, 9 Drawing Figures

PATENTED MAR 12 1974 3,796,191
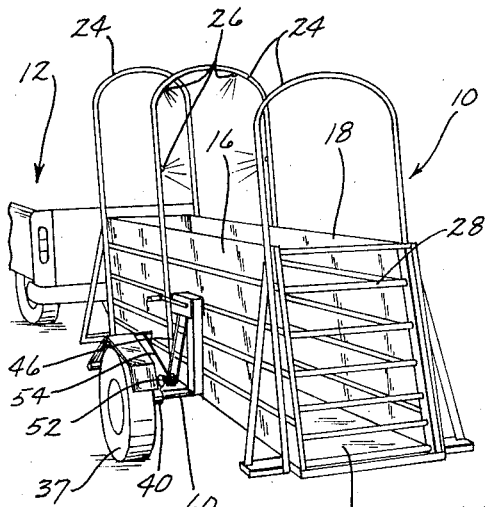
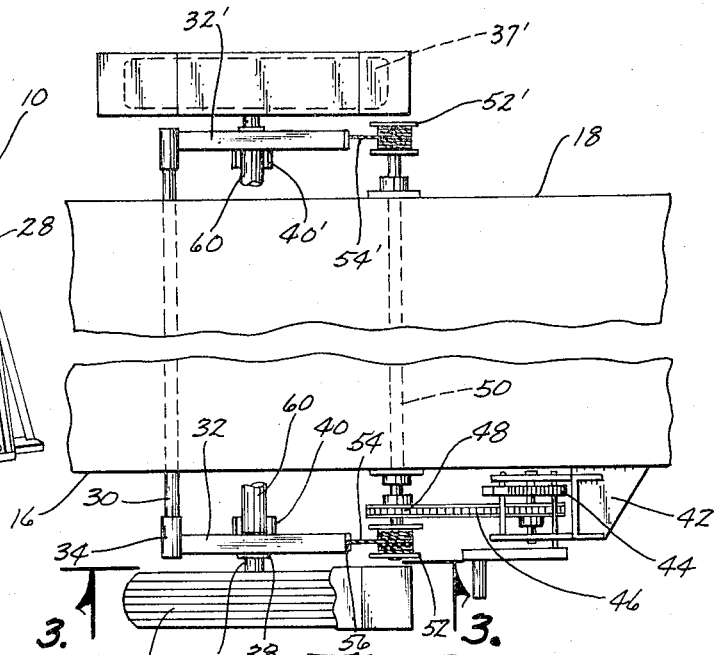
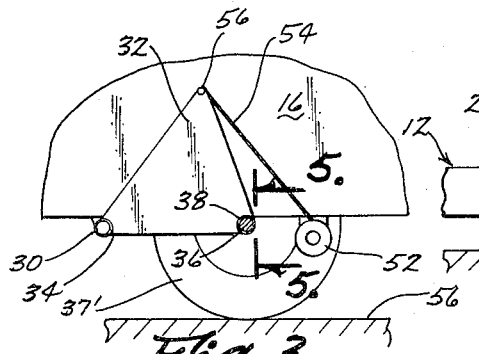
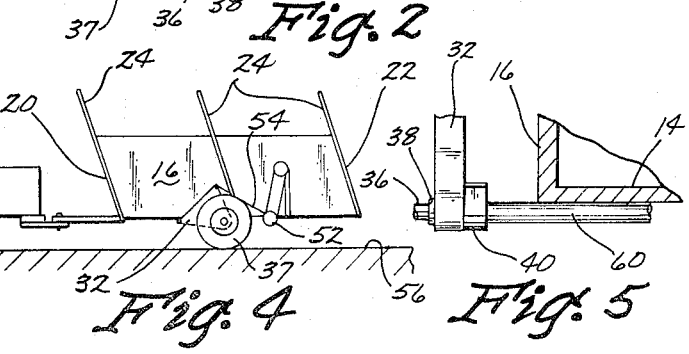
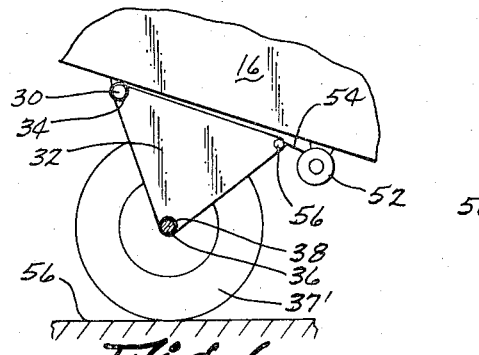
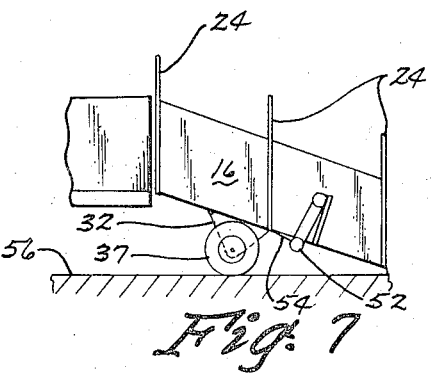
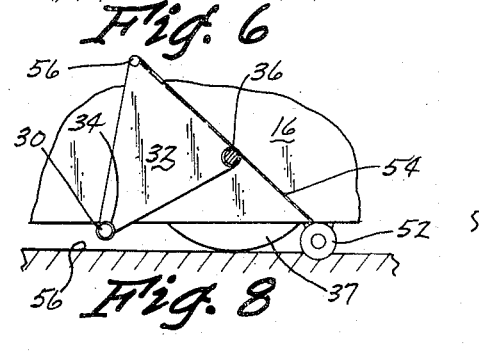
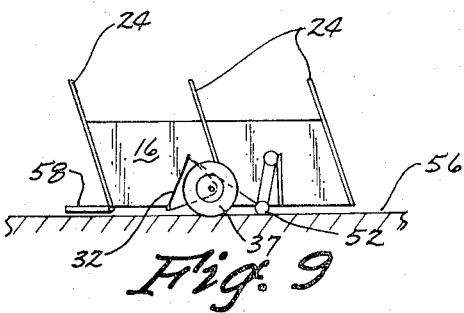

LOADING CHUTE WITH RETRACTABLE LANDING GEAR

Loading chutes generally comprise a wheeled chute device which may be transported from one location to another to enable animals to be loaded onto a truck or the like. The conventional loading chutes are quite expensive to manufacture and do not have as much versatility as is desired.

Therefore, it is a principal object of the invention to provide an improved loading chute.

A further object of the invention is to provide a loading chute with retractable landing gear.

A further object of the invention is to provide a loading chute which may serve as a loading chute, a holding chute and a trailer device.

A further object of the invention is to provide a loading chute having means thereon for efficiently retracting the landing gear associated therewith.

A further object of the invention is to provide a loading chute having an improved retractable landing gear mechanism.

A further object of the invention is to provide a loading chute having safety means thereon.

A further object of the invention is to provide a loading chute having a spray means associated therewith for spraying disinfectant or the like on the animals.

A further object of the invention is to provide a loading chute which is economical in manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a rear perspective view of the loading chute of this invention;

FIG. 2 is a partial top view of the loading chute with portions thereof cut away to more fully illustrate the invention;

FIG. 3 is a sectional view seen along lines 3—3 of FIG. 2 illustrating the landing gear in the transport position;

FIG. 4 is a side view illustrating the loading chute in a transport or trailer position;

FIG. 5 is a sectional view seen along lines 5—5 of FIG. 3;

FIG. 6 is a view similar to FIG. 3 except that the retractable landing gear is illustrated in the loading chute position;

FIG. 7 is a side view of the loading chute in its loading position;

FIG. 8 is a sectional view similar to FIGS. 3 and 6 with the landing gear being illustrated in its fully retracted position to enable the chute to serve as a holding chute; and FIG. 9 is a side view illustrating the chute being used as a holding chute.

The numeral 10 generally refers to the loading chute of this invention with the numeral 12 generally referring to a truck or the like. Chute 10 generally comprises a floor or bottom 14, opposite side walls 16 and 18, forward end 20 and rearward end 22. A plurality of arch bows 24 extend upwardly from the side walls 16 and 18 as seen in FIG. 1 to provide additional strength to the chute and to provide a means for extending an enclosure thereover if desired. The middle arch bow 24 is provided with a plurality of spray jets 26 which are suitably connected to a source of insecticide, disinfectant or other fluid under pressure to enable the animals to be sprayed while they are being held in the loading chute. A slidable gate 28 is provided in the rearward end of the chute 10 while the forward end would normally be provided with a suitable animal holding or retaining mechanism.

A shaft 30 is secured to and extends beneath the floor 14 as illustrated in FIG. 2 so that its opposite ends are positioned outwardly of the side walls 16 and 18. A triangular support 32 is pivotally or rotatably connected to one end of the shaft 30 adjacent the point 34 of the support 32. If desired, the connection between the support 32 and the shaft 30 could be rigid if the shaft 30 is rotatably secured to the floor 14. An axle spindle 36 is secured to the support 32 adjacent the point 38 of support 32. A U-shaped bracket 40 is secured to the inside surface of the support 32 opposite the axle spindle 36, the purpose thereof to be described in more detail hereinafter.

An upstanding post 42 is secured to the side wall 16 and has a conventional crank operated winch 44 mounted thereon. Chain 46 extends from the winch 44 and extends around a sprocket 48 mounted on one end of a shaft 50 which is rotatably secured to and extends beneath the floor 14 as illustrated in FIG. 2. Drum 52 is mounted on the shaft 50 outwardly of the sprocket 48 and has a cable 54 secured thereto and wound thereon. Cable 54 is secured to the triangular support 32 adjacent point 56 thereof.

The numeral 32' refers to a triangular support secured to the other end of the shaft 30 which is identical to the triangular support 32. The wheel 37' is secured to the support 32' in the same manner as wheel 37 is secured to support 32. Drum 52' is mounted on the end of shaft 50 outwardly of side wall 52 and has a cable 54' secured thereto and wound thereon which is connected to the support 32 in the manner in which cable 54 is secured to support 32. Thus, operation of the winch 44 causes the cables 54 and 54' to pivot the supports 32 and 32' with respect to the axle 30 and the chute. If the chute 10 is to be used as a holding chute, the winch 44 is operated to permit the cables 54 and 54' to unwind from the drums 52 and 52' respectively to permit the wheels 37 and 37' to pivot and move upwardly with respect to the floor of the chute so that the floor of the chute is lowered to a position adjacent the ground generally indicated by the reference numeral 56 in FIG. 9. The hitch 58 would have previously been disconnected from the truck 12. Thus, the chute device 10 when positioned in the relationship illustrated in FIG. 9 permits the animals to enter the chute and be held therein so that they may be treated, examined, etc.

If the loading chute is to be used to load animals onto a truck or the like, the winch 44 is operated to wind the cables 54 and 54' onto the drums 52 and 52' respectively so that the supports 32 and 32' and hence the wheels 37 and 37' to be pivotally moved to the position illustrated in FIGS. 6 and 7. In the position of FIGS. 6 and 7, the rearward end of the chute device is lowered into ground engagement with the forward end of the chute device being elevated with respect thereto so that the animals can be moved upwardly therethrough onto the truck. If the chute device is going to be used as a trailer such as illustrated in FIGS. 3 and 4, the winch 44 would be operated so that the bracket 40 and bracket 40' are positioned in a plane below the underside of the floor 14. A safety bar or pipe 60 is then inserted downwardly into the open upper ends of the U-shaped brackets 40 and 40' with the bar 60 then being positioned beneath the under side of the floor 14. Winch 44 is then operated to pivotally move the supports 32 and 32' with respect to the loading chute so that the floor 14 is lowered with respect to the ground until the underside of the floor 14 engages and rests upon the safety bar 60. The engagement of the floor 14 on the bar 60 takes the strain out of the cables 54 and 54' while the device is being moved from one location to another. It can be appreciated that if the bar 60 was not provided, the chute device could fall to the ground if the cables 54 and 54' became broken as the loading chute was moved over the road. It is important to note that the distance from the axis of drum 52 to shaft 30 is equal to the sum of the distance between shaft 30 and axle spindle 36 and the distance between axle spindle 36 and point 56. This relationship permits the winch to efficiently pivot the various components with respect to each other.

Thus it can be seen that a novel loading chute has been provided which can be used as a holding chute, loading chute and trailer device. Further, the loading chute of this invention is much more versatile and easier to move between its various positions due to the mechanism associated therewith. While the retractable landing gear disclosed herein is ideally suited for use with a loading chute, it should be noted that the landing gear is also well suited for use on any type of trailers such as snowmobile trailers, motorcycle trailers, etc. Thus it can be seen that the device accomplishes at least all of its stated objectives.

I claim:

1. A trailer with retractable landing gear comprising, a bed portion having opposite sides,
   a first shaft secured to and extending beneath said bed portion, the opposite ends of said first shaft being positioned outwardly of said sides of said bed portion,
   a first support means pivotally secured to one end of said first shaft,
   a second support means pivotally secured to the other end of said first shaft,
   first and second wheel members operatively rotatably secured to said first and second support means respectively,
   a winch means on said bed portion connected to said support means for selectively pivoting said support means with respect to said bed portion to cause said wheel members to be relatively raised and lowered with respect to said bed portion so that said bed portion may be lowered to a substantially horizontally disposed position closely adjacent the ground for loading purposes and so that said bed portion may be raised upwardly from said loading position to a transport position.

2. The trailer of claim 1 wherein said winch means comprises a second shaft secured to and rotatably extending beneath said bed portion, the opposite ends of said second shaft being positioned outwardly of said sides of said bed portion, a first cable connected at one end to and wound upon one end of said second shaft, said first cable being connected at its other end to said first support means, a second cable connected at one end to and wound upon the other end of said second shaft, said second cable being connected at its other end to said second support means, said winch means also including means for selectively rotating said second shaft.

3. The trailer of claim 2 wherein said means for rotating said second shaft comprises a winch member connected to said second shaft by a chain means.

4. The trailer of claim 1 wherein a safety bar means is detachably secured to and extends between said first and second support means beneath said bed portion for engagement therewith at times to prevent said bed portion from moving to its said loading position.

5. The trailer of claim 4 wherein said first and second support means each have inner and outer sides with respect to said sides, first and second U-shaped brackets secured to the inner sides of said support means, said safety bar means having its opposite ends detachably received by said brackets.

6. A trailer with retractable landing gear comprising, a bed portion having opposite sides,
   a first shaft secured to and extending beneath said bed portion, the opposite ends of said first shaft being positioned outwardly of said sides of said bed portion,
   a first support means pivotally secured to one end of said first shaft,
   a second support means pivotally secured at the other end of said first shaft,
   first and second wheel members operatively rotatably secured to said first and second support means respectively,
   a winch means on said bed portion connected to said support means for selectively pivoting said support means with respect to said bed portion to cause said wheel members to be relatively raised and lowered with respect to said bed portion,
   said first and second support means comprising first and second triangular supports respectively, said first shaft being pivotally secured at its opposite ends to one of the points of said triangular supports, said first and second wheel members being operatively rotatably secured to said first and second triangular supports adjacent a second point thereon, said winch means being connected to said triangular supports adjacent the third points thereof.

7. The trailer of claim 6 wherein said winch means comprises a second shaft secured to and rotatably extending beneath said bed portion, the opposite ends of said second shaft being positioned outwardly of said sides of said bed portion, a first cable connected at one end to and wound upon one end of said second shaft, said first cable being connected at its other end to said first support means, a second cable connected at one end to and wound upon the other end of said second shaft, said second cable being connected as its other end to said second support means, and means for selectively rotating said second shaft, the distance between the longitudinal axes of said first and second shafts being substantially equal to the sum of the distance between said first point and said second point and said second point and said third point on one of said triangular supports.

8. The trailer of claim 6 wherein said bed portion comprises an animal loading chute.

9. The trailer of claim 6 wherein said triangular supports each have inner and outer sides with respect to the sides of said bed portion, and a safety bar means detachably secured to and extending between said triangular supports beneath said bed portion for engagement therewith at times.

10. The trailer of claim 9 wherein first and second U-shaped brackets are secured to the inner sides of said triangular supports, said safety bar means having its opposite ends detachably received by said brackets, said brackets each being positioned oppositely of said second points on said triangular supports.

* * * * *